United States Patent
Tunali et al.

(10) Patent No.: US 9,595,114 B2
(45) Date of Patent: Mar. 14, 2017

(54) SEMI AUTOMATIC TARGET INITIALIZATION METHOD BASED ON VISUAL SALIENCY

(71) Applicant: ASELSAN ELEKTRONIK SANAYI VE TICARET ANONIM SIRKETI, Ankara (TR)

(72) Inventors: Emre Tunali, Ankara (TR); Sinan Oz, Ankara (TR); Caglar Aytekin, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 14/915,627

(22) PCT Filed: Aug. 28, 2013

(86) PCT No.: PCT/IB2013/058072
§ 371 (c)(1),
(2) Date: Feb. 29, 2016

(87) PCT Pub. No.: WO2015/028842
PCT Pub. Date: Mar. 5, 2015

(65) Prior Publication Data
US 2016/0239981 A1    Aug. 18, 2016

(51) Int. Cl.
*G06T 7/00* (2006.01)
*G06K 9/46* (2006.01)

(52) U.S. Cl.
CPC .......... *G06T 7/0081* (2013.01); *G06K 9/4642* (2013.01); *G06K 9/4676* (2013.01); *G06T 2207/20076* (2013.01)

(58) Field of Classification Search
CPC ........ G06T 7/0081; G06T 2207/20076; G06K 9/4642; G06K 9/4676
See application file for complete search history.

(56) References Cited

U.S. PATENT DOCUMENTS 5,822,453 A * 10/1998 Lee ...................... H04N 1/4074
   382/168
8,600,105 B2 * 12/2013 Connell .................. G06K 9/38
   345/581

(Continued)

FOREIGN PATENT DOCUMENTS

CN      101329767      12/2008

OTHER PUBLICATIONS

Sezgin et al. ("Survey over image thresholding techniques and quantitative performance evaluation," J. Electron. Imaging. 13(1), 146-168, 01 Jan. 1, 2004).*

(Continued)

*Primary Examiner* — Yubin Hung
(74) *Attorney, Agent, or Firm* — Gokalp Bayramoglu

(57) ABSTRACT

Target initialization can dramatically change the performance of the tracker, since the initial window determines for the tracker what to track. In order to achieve a better tracking performance; The present invention relates to a method of semi automatic target initialization based on visual saliency for a given point coordinate in the vicinity of target by the user. Performance boost of tracker is mainly based on two key features of target initialization algorithm: It is capable of compensating erroneous user input; also selecting the most distinctive, salient part of object as target, so better discrimination is achieved between the target and background. Experimental results show that tracking performance is boosted in scenarios, in which the tracking is initialized by the proposed algorithm. Very low computational cost and requirement of only a point coordinate as input in the neighborhood of the target make this approach preferable in real time tracking applications.

8 Claims, 7 Drawing Sheets

(56) References Cited

U.S. PATENT DOCUMENTS

| | | | |
|---|---|---|---|
| 2008/0304740 A1 | 12/2008 | Sun et al. | |
| 2012/0288189 A1 | 11/2012 | Hu | |
| 2012/0294476 A1 | 11/2012 | Wei et al. | |
| 2012/0328161 A1* | 12/2012 | Palenychka | G06K 9/00771 382/107 |
| 2014/0211987 A1* | 7/2014 | Fan | G06K 9/0063 382/103 |
| 2015/0055824 A1* | 2/2015 | Hong | G06K 9/00624 382/103 |

OTHER PUBLICATIONS

Wei et al. ("Geodesic Saliency Using Background Priors", Computer Vision ECCV 2012, Oct. 7, 2012, pp. 29-42).*

Tuan Q Pham ("Non-maximum Suppression Using Fewer than Two Comparisons per Pixel," Advance Concepts For Intelligent Vision System, Dec. 13, 2010, pp. 438-451).*

Pele et al. ("The Quadratic-Chi Histogram Distance Family," Compute Vision a ECCV 2010, Sep. 5, 2010, pp. 749-762).*

Klein et al. ("Center-surround Divergence of Feature Statistics for Salient Object Detection," 2011 IEEE International Conference on Computer Vision (ICCV), Nov. 6, 2011, pp. 2214-2219).*

Liu et al. ("Learning to Detect a Salient Object," Transactions on Pattern Analysis and Machine Intelligence, IEEE, vol. 33, No. 2, Feb. 1, 2011, pp. 353-367).*

Tie Liu et al. "Learning to Detect a Salient object", Transactions on Pattern Analysis and Machine Intelligent,IEEE,Piscataway USA, vol. 33, No. 2, Feb. 1, 2011, pp. 353-367, abstract figures1, 4,12,17,21, sections 1, 2, 2.1, 3.1.2, 4.2,4.2.1, 4.5.1.

Yichen Wei et al. "Geodeisic Saliency Using Background Priors",Oct. 7, 2012, Computer Vision ECCV2012,Springer, Berlin,Heidelberg, Berlin, Heidelberg,pp. 29-42.

Tuan Q Pham Ed-Jacques Blanc-Talon et al. "Non-maximum Suppression Using Fewer than Two Comparisons per Pixel", Dec. 13, 2010, Advanced Concepts for Intelligent Vision Systems, Springer Berlin Heidelberg,Berlin,Heidelberg, pp. 438-451.

Ofir Pele et al."The Quadratic-Chi Histogram Distance Family",Sep. 5, 2010,Compufer Vision A ECCV 2010, Spirnger Berlin Heidelberg, Berlin,Heidelberg pp. 749-762.

Dominik A Klein et al."Center-surround divergence of feature statistics for salient object detection",Computer Vision:2011 IEEE International Conference on IEEE,Nov. 6, 2011, pp. 2214-2219.

* cited by examiner

SEMI AUTOMATIC TARGET INITIALIZATION METHOD BASED ON VISUAL SALIENCY

FIELD OF THE INVENTION

The present invention relates to a robust method of semi automatic target initialization based on visual saliency for a given point coordinate in the vicinity of target by the user.

BACKGROUND OF THE INVENTION

Majority of tracking algorithms assumes predetermined target location and size for initialization of tracking. Hence, in many applications, target size and location are required as input from human-users. However, target initialization can drastically change the performance of the tracker since this initial window tells the tracker what to track, i.e. the features, appearance, contours. Hence, any insignificant or false information, i.e. parts of objects similar to common background or patches from background may result in a mislearning of target appearance. Moreover, in real time applications, erroneous input is usually provided by the user due to obligation to mark the target instantly. This erroneous input usually results in track losses prematurely. Therefore, if, long-term tracking performance desired to be achieved this erroneous input should be compensated. In this sense a method is proposed for target initialization which is capable of long-term tracking.

China patent document CN101329767 discloses an automatic inspection method of a significant object sequence based on studying videos. In the method of the invention, first static significant features then dynamic significant features are calculated and self-adaptively combined according to the space continuity of each image of frame and the time continuity of significant objects in neighboring images. Since this method generally takes several seconds to process an image, it is not appropriate for real-time applications.

United States patent document US2012288189, an application in the state of the art, discloses an image processing method which includes a segmentation step that segments an input image into a plurality of regions by using an automatic segmentation algorithm, and a computation step that calculates a saliency value of one region of the plurality of segmented regions by using a weighted sum of color differences between the one region and all other regions. Accordingly, it is possible to automatically analyze visual saliency regions in an image, and a result of analysis can be used in application areas including significant object detection, object recognition, adaptive image compression, content-aware image resizing, and image retrieval. However, change in image resolution result in change in processing time which may exceed real-time application limits.

United States patent document US2008304740, an application in the state of the art, discloses methods for detecting a salient object in an input image are described. For this, the salient object in an image may be defined using a set of local, regional, and global features including multi-scale contrast, center-surround histogram, and color spatial distribution. These features are optimally combined through conditional random field learning. The learned conditional random field is then used to locate the salient object in the image. The methods can also use image segmentation, where the salient object is separated from the image background. However, obviously it is not proper for the real time usage.

United States patent document US20120294476, an application in the state of the art, discloses methods for detecting a salient object in an input image are described. To find the salient objects, a computing device determines saliency measures for locations in the image based on costs of composing the locations from parts of the image outside of those locations. In the beginning of the process, input image is segmented into parts then saliency measures are calculated based on appearance and spatial distances for locations defined by sliding windows. In conclusion, this system can not be proper for the real time usage.

The document titled "Learning to detect a salient object (Tie Liu et al.)" discloses an approach for salient object detection, which is formulated as a binary labeling problem using a set of local, regional, and global salient object features.

SUMMARY OF THE INVENTION

Objective of the present invention is to provide target initialization framework which takes a single image coordinate from the user and returns the most salient region bounding box in the neighborhood. The proposed framework includes two outstanding features which are also proven. Firstly, it is very robust for user input error meaning that exactly same target initialization can be achieved even if the given coordinate scatters in a neighborhood. Secondly, since target initialization is based on visual saliency, it results in more discriminative targets with respect to background and provides long-term tracking even in trackers that claim to deal with discrimination problem during tracking.

In process; first, a center-surround difference based initial window selection is utilized around the input point coordinate provided by the user, in order to select the window which is most likely to contain the actual target and background satisfying piecewise connectivity. Then, a visual saliency algorithm (geodesic saliency, Wei et al., 2012) is used for calculation of saliency map. Finally, proposed thresholding method is used to detect the bounding box encapsulating the target.

This summary is provided to introduce the objective and the simplified concepts of target initialization described in Detailed Description of the Invention.

BRIEF DESCRIPTION OF CONTENTS

A system and method realized to fulfill the objective of the present invention is illustrated in the accompanying figures, in which.

Figure 1:
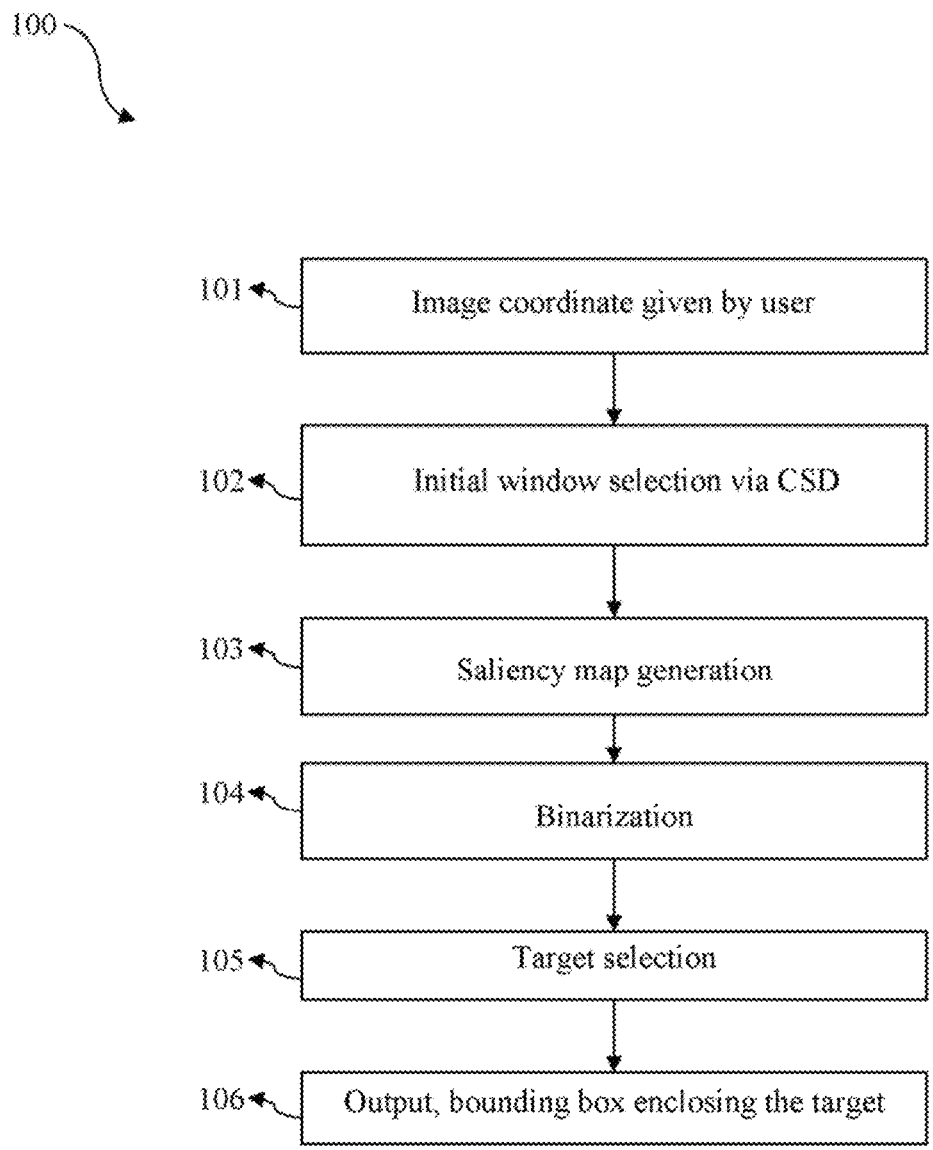
FIG. 1 is the flowchart of the method for semi automatic target initialization.

A method for semi automatic target initialization (100) fundamentally comprises the following steps, inputting an image coordinate by user (101),
selecting an initial window around the image coordinate by center-surround histogram distance 102),
generating saliency map of the window (103),
binarizing the saliency map (104), selecting a target (105),
outputting a bounding box enclosing the target (106).

In the method for semi automatic target initialization (100), the step of "initial window selection via CSD (102)" further comprises the sub-steps of
obtaining a foreground histogram (202),
obtaining a background histogram (203), calculating a quadratic-chi histogram distance (204),
obtaining a histogram distance vector by repeating steps 202, 203 and 204 for each window size (205),
selecting 1st local maximum of the histogram distance vector as initial window size (206).

In the method for semi automatic target initialization (100), the step of "saliency map generation (103)" further comprises the sub-steps of;
calculating a mean intensity for patches obtained by any super pixel selection algorithm (302),
calculating a mean intensity difference in eight neighborhood and assign as weights (303),
calculating the shortest path from each foreground patch to a background patch (304),
returning the saliency map by normalizing the values calculated as the shortest path (305).

In the method for semi automatic target initialization (100), the step of "binarization (104)" further comprises the sub-steps of;
detecting local maxima of the saliency map and sorting them in descending order to obtain a vector LocalMax$_{sorted}$ (402),
calculating a normalized laplacian of the vector with the formula;

$$\nabla^2_{norm}(f) = \frac{\nabla^2(f) - \min(\nabla^2(f))}{\sum_i \nabla^2(f)|_i - \min(\nabla^2(f))}, \quad ((403)$$

obtaining a threshold by calculating a weighted average of the vector with the formula Thr=LocalMax$_{sorted}^T \cdot \nabla_{norm}^2$(LocalMax$_{sorted}$) ((404),
binarizing the saliency map with the threshold (405), In the method for semi automatic target initialization (100), the step of "target selection (105)" further comprises the sub-steps of;
executing connected component analysis on the threshold saliency map (501),
inputting each component to the energy function and selecting the component maximizing the regularization energy as target (502),
reporting the bounding box of the connected component as target having the most salient region with minimum distance to center with formula;

$$\mathrm{argmax}_{c_i} \frac{c_i^T s}{sqrt((x_i - x_c)^2 + (y_i - y_c)^2)}. \quad (503)$$

DETAILED DESCRIPTION OF THE INVENTION

Hereinafter, present invention will be described in more detail with reference to attached drawings. The following embodiments are presented only for the purpose of describing the present invention, and are not intended to limit the scope of the present invention.

Figure 2:
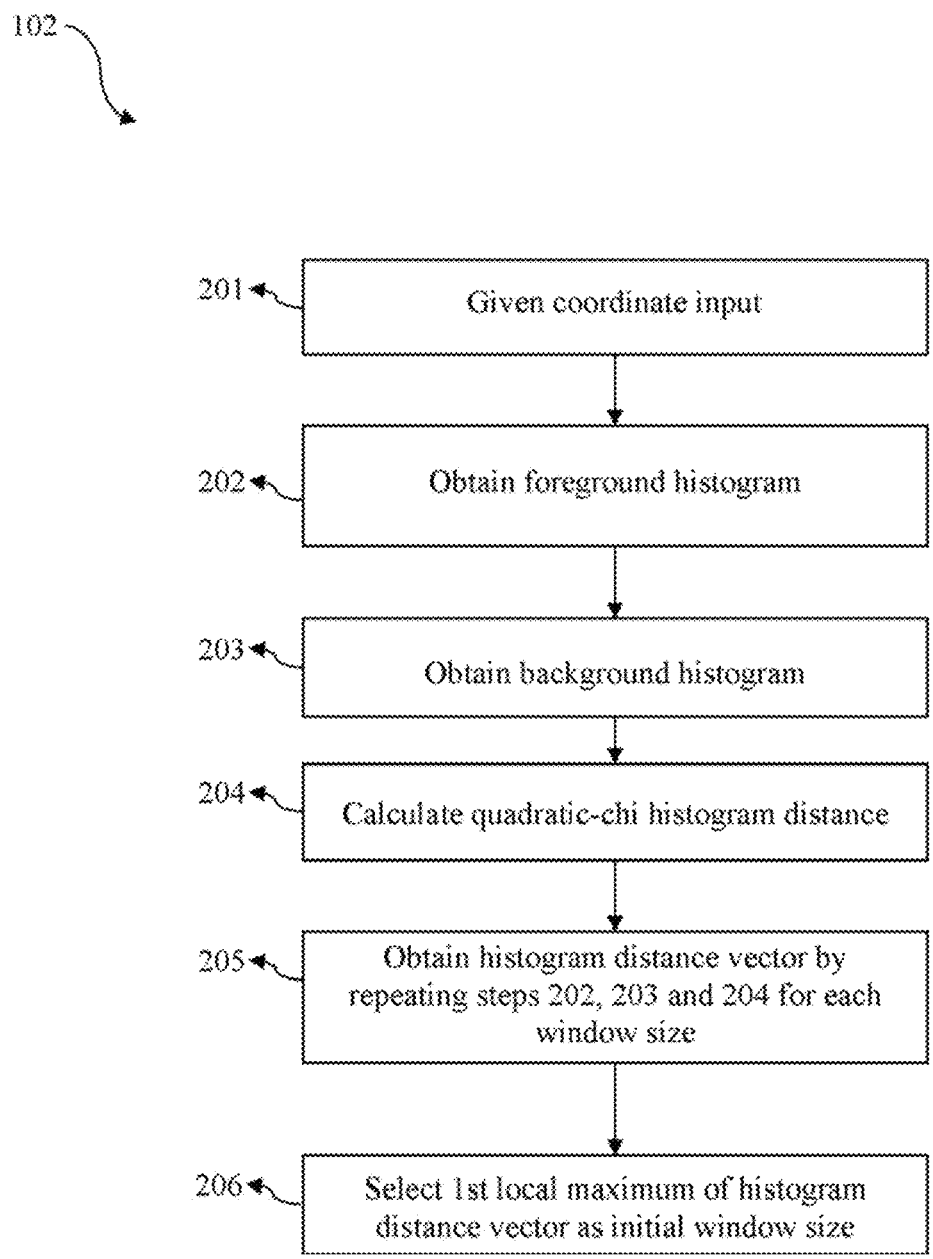
FIG. 2 is the flowchart of the sub-step of initial window selection via CSD.
Figure 3:
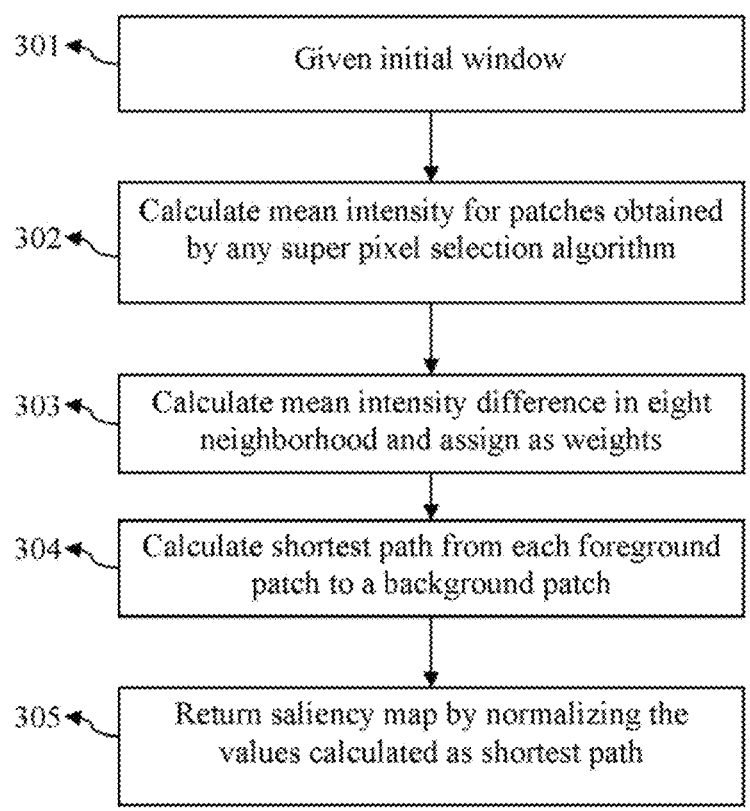
FIG. 3 is the flowchart of the sub-step of saliency map generation.
Figure 4:
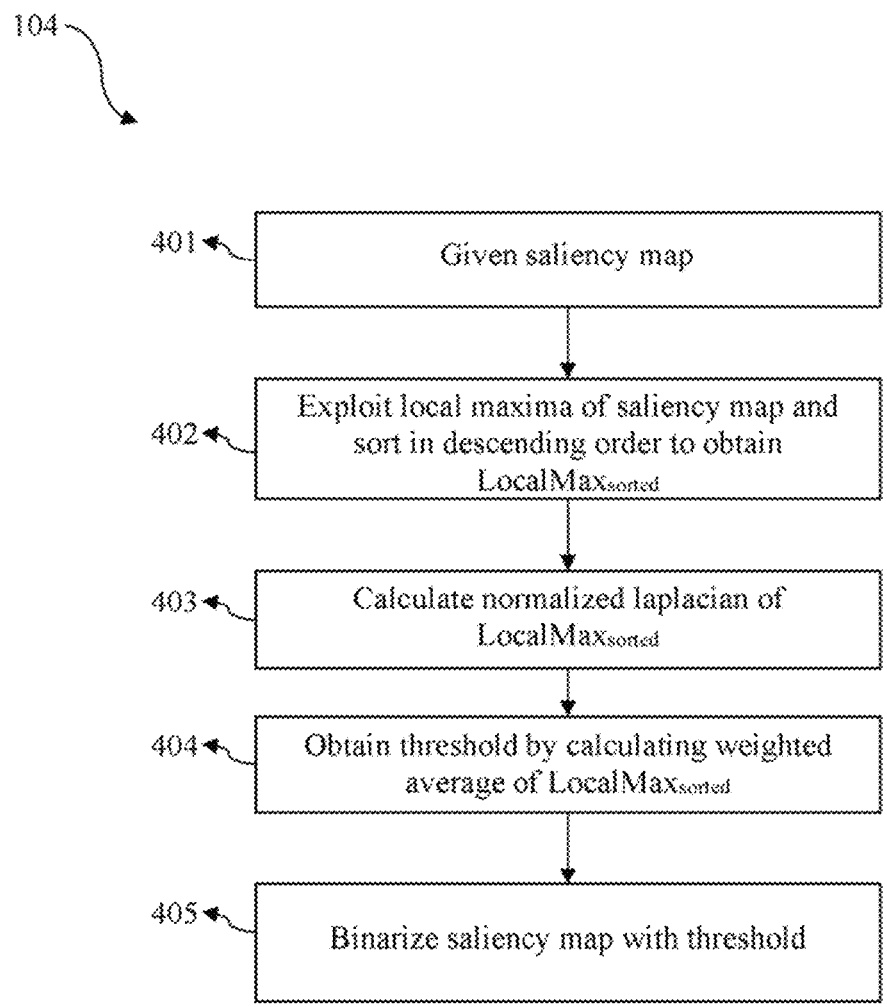
FIG. 4 is the flowchart of the sub-step of binarization.
Figure 5:
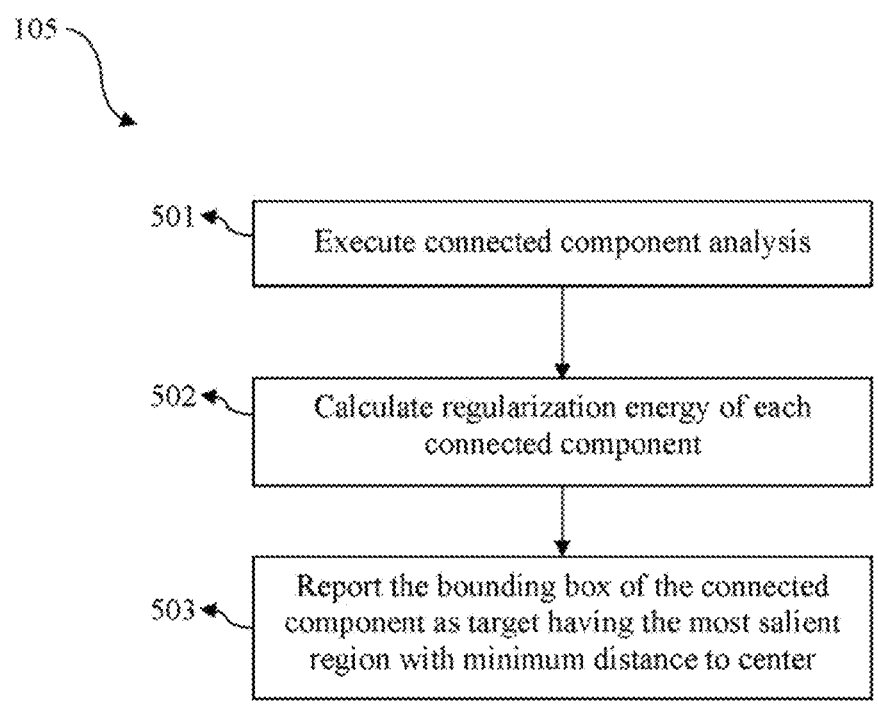
FIG. 5 is the flowchart of the sub-step of target selection.

The target initialization method proposed in this study consists of three main steps: First, an initial window selection method based on center-surround histogram difference is processed (FIG. 2), then saliency map in this window is calculated by the method (Wei et al., 2012) (FIG. 3) and the saliency map is thresholded (FIG. 4). Finally, the connected component having maximum total saliency with minimum distance to the center is selected as initial target location (FIG. 5). All the procedure is started by user with a marking input which is the single point coordinate in the vicinity of the target. These steps are extensively analyzed in this chapter.

Initial Window Selection

In method for Semi Automatic Target Initialization (100), for processing a CSD (center-surround histogram difference) based initial search window selection, the user selects a point in the image to start the procedure. The motivation of selecting an initial window is to include the foreground and to provide a feasible background for the saliency evaluation method which assumes that most of the image boundaries belong to the background and the background patches are piecewise connected. This makes the saliency detection sensitive to the image boundary; hence a proper window selection is required. First, we calculate the center-surround histogram distances in windows of multiple sizes around the pixel marked by the user. In order to ensure the piecewise connectivity assumption in the saliency detection, the window which gives the first local maximum of histogram distance (HD) vector is chosen as initial window. The HD is defined as follows;

$$\mathrm{HD}(i) = K(B_{wi}, F_{wi}) \quad \text{Eqn. 1}$$

where K is a distance measure between $B_{wi}$ and $F_{wi}$ which are the foreground and background histograms of window $w_i$ and I=1,2,3, . . . ,N.

Figure 6:
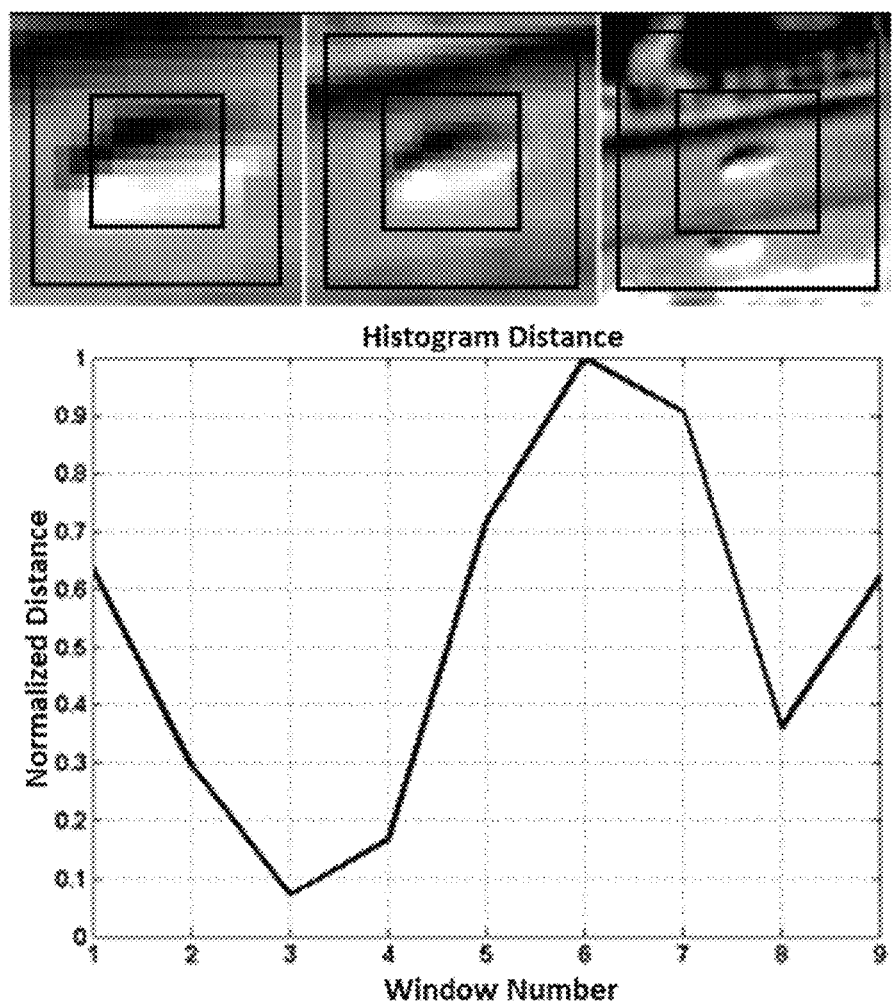
FIG. 6 is the background, foreground and histogram distance for different window sizes.

Local maxima other than the first one can have a larger CSD. Actually, these maxima appear in windows with layered background patches, where the background region may correspond to only some patches of real background, whereas the foreground window may cover the actual foreground together with another layer of background (FIG. 6). However, we wish to obtain an initial window where background patches are piecewise connected, which may not be case in some local maxima other than the first one. Therefore, initial window is selected corresponding to first local maximum of HD(i).

Figure 7:
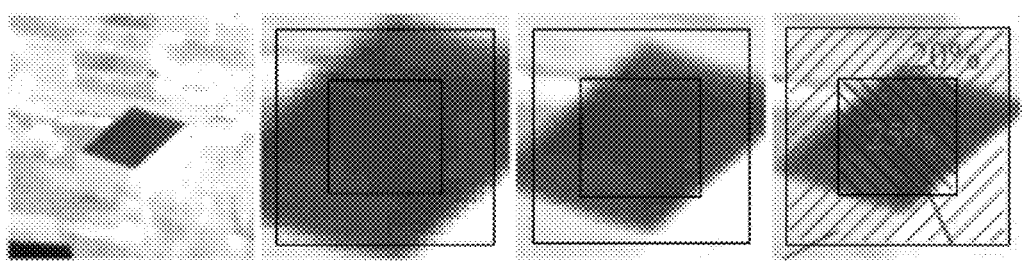
FIG. 7 is the exemplary usage of deadzone in compensation of elongated objects.
Figure 8:
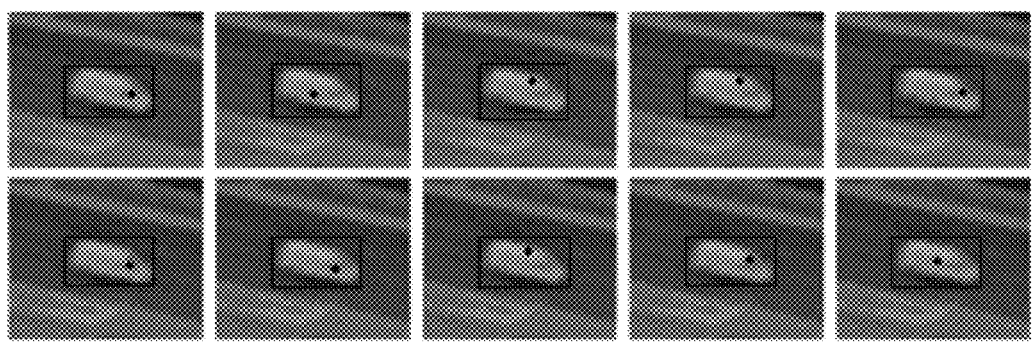
FIG. 8 is the output with various user inputs.

During the selection of initial window, various object shapes are desired to be handled also. However, since the foreground and background regions of each window are selected as square boxes, objects with shapes deviating from a square can be problematic. For example, if foreground window is selected as encapsulating the whole target in FIG. 7, this square window also includes regions from background which decrease CSD. To compensate this effect we introduce a dead-zone region when calculating CSD. The foreground and background is decided to cover the 25 and 20 percent of the selected window area respectively and the remaining area to be a dead-zone. This selection is realized to help dealing with targets with large deviation from square shape (FIG. 7). Another issue is the calculation of histogram distances of foreground and background. For this purpose, quadratic-chi histogram distance (Pete and Werman, 2010) is utilized, since it suits to the problem in two aspects. First, it is capable of handling quantization effects that occurs when close intensity values are mapped into different histogram bins by using similarity matrix which is taking care of crossbin relationship. Second, it suppresses the distances resulting from bins with high values. Formulation of quadratic-chi histogram distance is given in Eqn. 2 as:

$$QC_m^A(P, Q) = \sqrt{\sum_{ij}\left(\frac{(P_i - Q_i)}{(\sum_c (P_c + Q_c)A_{ci})^m}\right)\left(\frac{(P_j - Q_j)}{(\sum_c (P_c + Q_c)A_{cj})^m}\right)A_{ij}} \quad \text{Eqn. 2}$$

where P and Q represent N dimensional nonnegative bounded foreground and background histograms, "i, j" are histogram bins, A is the nonnegative symmetric bin similarity matrix which is N×N and m is the normalization factor retaining distance due to high bin values.

Saliency Map Calculation

The saliency map of the window, selected by the algorithm above, is extracted by a recently proposed fast saliency extraction method (Wei et al., 2012) in which the saliency problem is tackled from different perspective by focusing on background more than the object. This method is capable of extracting a saliency map within few milliseconds; however, it has two basic assumptions for the input image that should be guaranteed, namely boundary and connectivity. The boundary assumption is reflection of a basic tendency that photographer/cameraman do not crop salient objects among the frame. Therefore, the image boundary is usually background. The connectivity assumption comes from the fact that background regions are generally tend to be large and homogenous, i.e. sky, grass. In other words, most image patches can be easily connected to each other piecewisely. In our case, these two assumptions are fulfilled with initial window selection method. Satisfying these two conditions, the salient regions are assumed to be the patches that are extracted by downscaling or by any super pixel extraction algorithm with high geodesic distance from the boundaries of the image that is assumed to correspond to piecewise-connected background regions. The geodesic saliency of a patch p is the accumulated edge weights along the shortest path from p to virtual background node b in an undirected weighted graph, $$S(p) = \min_{p_1=p, p_2, \ldots, p_n=b} \sum_{i=1}^{n-1} \text{weight}(p_i, p_{i+1}), \quad \text{Eqn. 3}$$

s.t. $(p_i, p_{i+1}) \in \varepsilon$

Note that, since patches close to the center of the image requires a longer path in order to reach the background, accumulations of weights tend to be larger in the center patches. Therefore, this method also favors the center image regions as more salient which is reasonable since salient regions tend to occur around the center of image.

Binarization of Saliency Map and Target Selection

Since we look for a fast target initialization, we wish to keep the computational cost at minimum even in the binarization step. Hence, a fast binarization approach is proposed here exploiting the local maxima of saliency map. The threshold is selected by a weighted average of local maxima of the saliency map (Eqn. 4). In this sense, for fast binarization process, fast local maxima detection is required. Here, a fast local maxima detection algorithm (Pham, 2010) is used. After detection of local maxima, we form a vector $LocalMax_{sorted}$ by sorting the local maxima in descending order, and the normalized laplacian of this vector is calculated with Eqn. 5 and is used as weights for local maxima. This is meaningful since the local maxima with higher laplacian represent a distinctive fall within local maxima. We shall favor these values when calculating the threshold level since distinctive falls are indicators of split between regions with higher saliency with respect to their surroundings. Hence, a threshold would be suitable for binarization around the most distinctive fall; greatest weight is given to that local maximum in the weighted average of local maxima.

$$Thr = LocalMax_{sorted}^T \cdot \nabla_{norm}^2(LocalMax_{sorted}) \quad \text{Eqn. 4}$$

where $$\nabla_{norm}^2(f) = \frac{\nabla^2(f) - \min(\nabla^2(f))}{\sum_i \nabla^2(f)|_i - \min(\nabla^2(f))} \quad \text{Eqn. 5}$$

In order to sort the local maxima in a fast manner, we generate a binary tree with heap property in the phase of local maxima selection. Then, sorting is accomplished in, classical sense by selecting the first element, highest, and then reordering the heap at each turn until all local maxima are sorted. After thresholding the saliency map, the connected component maximizing the regularization energy given by Eqn. 6, i.e. the most salient region with minimum distance to the center, is selected as the target.

$$\text{argmax}_{c_i} \frac{c_i^T s}{sqrt((x_i - x_c)^2 + (y_i - y_c)^2)} \quad \text{Eqn. 6}$$

where $C_i$ is the vectorized form obtained by raster scanning the 2D label matrix with values 1 and 0 as foreground and background respectively, S is the saliency map vectorized similarly and $(x_i, y_i)$, $(x_c, y_c)$ are the centers of each connected component and the initial window respectively. Finally, the bounding box encapsulating the selected connected component is reported as output of whole target initialization framework.

In conclusion, it is a well-known fact that target initialization can dramatically change the performance of the tracker. Therefore, in order to achieve a better tracking performance; we proposed a fast, saliency based semi automatic target initialization method (100). Performance boost of tracker is mainly based on two key features of target initialization algorithm: It is capable of compensating erroneous user input; and also selecting the most distinctive, salient part of object as target, so better discrimination is achieved between the target and background.

Experimental results show that tracking performance is boosted in scenarios, in which the tracking is initialized by the proposed algorithm. Moreover, very low computational cost and requitement of only a point coordinate as input in the neighborhood of the target make this approach user friendly and preferable in real time tracking applications.

The invention claimed is:
1. A method for semi automatic target initialization (100) comprises the steps of,
  inputting an image coordinate by user (101),
  selecting an initial window around the image coordinate by center-surround histogram distance (102),
  generating saliency map of the window (103),
  binarizing the saliency map (104),
  selecting a target (105), outputting a bounding box enclosing the target (106) and characterized by the following steps for binarizing the saliency map;

detecting local maxima of the saliency map and sorting them in descending order to obtain a vector LocalMax$_{sorted}$ (402), calculating a normalized laplacian of the vector with the formula;

$$\nabla^2_{norm}(f) = \frac{\nabla^2(f) - \min(\nabla^2(f))}{\sum_i \nabla^2(f)|_i - \min(\nabla^2(f))}, \quad (403)$$

obtaining a threshold by calculating a weighted average of the vector with the formula Thr=LocalMax$_{sorted}^T \cdot \nabla_{norm}^2$(LocalMax$_{sorted}$) (404), binarizing the saliency map with the threshold (405), and wherein the step of selecting a target comprises selecting the most salient connected component in the binarized saliency map with minimum distance to the center.

2. A method for semi automatic target initialization (100) according to claim 1, comprising the steps of;

obtaining a foreground histogram (202), obtaining a background histogram (203), calculating a quadratic-chi histogram distance (204), obtaining a histogram distance vector by repeating steps 202,203 and 204 for each window size (205), selecting 1st local maximum of the histogram distance vector as initial window size (206) in the step "selecting an initial window via center-surround histogram difference (102)".

3. A method for semi automatic target initialization (100) according to claim 1, comprising the steps of, calculating a mean intensity for patches obtained by any super pixel selection algorithm (302), calculating a mean intensity difference in eight neighborhood and assign as weights (303), calculating the shortest path from each foreground patch to a background patch (304), returning the saliency map by normalizing the values calculated as the shortest path (305).

4. A method for semi automatic target initialization (100)) according to claim 1, comprising the steps of, executing connected component analysis on the threshold saliency map (501), inputting each component to the energy function and selecting the component maximizing the regularization energy as target (502), reporting the bounding box of the connected component as target having the most salient region with minimum distance to center with formula;

$$\operatorname{argmax}_{c_i} \frac{c_i^T s}{sqrt((x_i - x_c)^2 + (y_i - y_c)^2)}. \quad (503)$$

5. A method for semi automatic target initialization (100) according to claim 1, wherein the step "initial window selection via center-surround histogram difference (102)" defines proper window that includes foreground and background which is capable of fulfilling the assumptions that are made in saliency generation method.

6. A method for semi automatic target initialization (100) according to claim 1, wherein initial window selection is started with histogram distance vector generation and finalized by selection of initial window size which corresponds $1^{st}$ local maximum of the histogram distance vector.

7. A method for semi automatic target initialization (100) according to claim 1, is suitable for long-term tracking since it boosts performance of tracker by achieving better discrimination between the target and background.

8. A method for semi automatic target initialization (100) according to claim 1, wherein target bounding box is found with just a click by the user in step "image coordinate given by user (101)" turns the target initializer into a user friendly framework.

* * * * *